(12) United States Patent
Custer et al.

(10) Patent No.: US 10,788,082 B2
(45) Date of Patent: Sep. 29, 2020

(54) TRANSMISSION CLUTCH INCLUDING LOCKING TORSION SPRING

(71) Applicant: Eaton Intelligent Power Limited, Dublin (IE)

(72) Inventors: Shane Anthony Custer, Garrett, IN (US); James Lee Whitaker, Hicksville, OH (US); Troy Scott Reinoehl, Pine, CO (US); Paige Elizabeth Canzonieri, Minneapolis, MN (US); Clinton Lee McClellan, Avilla, IN (US); William Andrew David, Fort Wayne, IN (US)

(73) Assignee: Eaton Intelligent Power Limited, Dublin (IE)

( * ) Notice: Subject to any disclaimer, the term of this patent is extended or adjusted under 35 U.S.C. 154(b) by 207 days.

(21) Appl. No.: 15/985,318

(22) Filed: May 21, 2018

(65) Prior Publication Data
US 2019/0353210 A1 Nov. 21, 2019

(51) Int. Cl.
*F16D 13/75* (2006.01)
*F16D 13/40* (2006.01)
(Continued)

(52) U.S. Cl.
CPC .......... *F16D 13/757* (2013.01); *F16D 13/40* (2013.01); *F16D 2013/586* (2013.01); *F16D 2013/642* (2013.01); *F16D 2300/12* (2013.01)

(58) Field of Classification Search
CPC .. F16D 13/40; F16D 13/583–2013/586; F16D 13/642; F16D 13/757
See application file for complete search history.

(56) References Cited

U.S. PATENT DOCUMENTS 5,404,979 A * 4/1995 Craft ................ F16D 13/757
192/111.18
6,029,787 A * 2/2000 Reik ................. F16D 13/585
192/111.19
(Continued)

*Primary Examiner* — David R Morris
*Assistant Examiner* — James J Taylor, II
(74) *Attorney, Agent, or Firm* — Dinsmore & Shohl LLP

(57) ABSTRACT

An adjustment mechanism for a clutch is positioned between the diaphragm spring and the pressure plate, the adjustment mechanism including: a first cam ring rotatably fixed with respect to the pressure plate, a second cam ring rotatable relative to the first cam ring and both cam rings having a plurality of cam surfaces configured such that rotation of the second cam ring relative to the first cam ring varies a height of the adjustment mechanism, and a torsion spring including a longitudinal axis. The torsion spring is disposed in the annular groove. The torsion spring includes a helical round cylindrical body that extends to a first end connected to the first cam ring and the torsion spring has a second end connected to the pressure plate. The torsion spring applies a biasing force to the second cam ring promoting rotation of the second cam ring relative to the first cam ring. The pressure plate includes a locking slot formed therein partially through the pressure plate and through the opposing surface. The locking slot is formed at an angle relative to the opposing surface and the second end of the torsion spring includes a locking hook formed thereon. The locking hook extends perpendicular to the longitudinal axis of the torsion spring. The locking hook is disposed in the locking slot fixing the locking hook relative to the pressure plate.

21 Claims, 12 Drawing Sheets

(51) Int. Cl.
*F16D 13/64* (2006.01)
*F16D 13/58* (2006.01)

(56) References Cited

U.S. PATENT DOCUMENTS

| | | | |
|---|---|---|---|
| 6,053,297 A | | 4/2000 | Kummer |
| 6,109,412 A | * | 8/2000 | Cole .................... F16D 13/757 |
| | | | 192/111.3 |
| 6,591,957 B2 | * | 7/2003 | Weidinger ............ F16D 13/757 |
| | | | 192/111.2 |
| 6,779,643 B2 | * | 8/2004 | Doremus .............. F16D 13/757 |
| | | | 192/111.3 |
| 7,712,595 B2 | | 5/2010 | McCutcheon et al. |
| 8,997,963 B2 | | 4/2015 | Reinoehl et al. |
| 2015/0260234 A1 | | 9/2015 | Peterson et al. |

* cited by examiner

US 10,788,082 B2

TRANSMISSION CLUTCH INCLUDING LOCKING TORSION SPRING

FIELD OF THE INVENTION

The invention relates to transmissions clutches and more particularly to friction clutches including a torsion spring that locks relative to a portion of the clutch.

BACKGROUND OF THE INVENTION

Dry friction clutches may be utilized for selective engagement of an engine with an input shaft of a transmission. Generally, dry clutches have a cover that is spaced from and connected with an engine flywheel. Inside the cover is a pressure plate that is connected to the cover and is axially moveable towards the flywheel. Positioned between pressure plate and flywheel is a friction disc. The friction disc is connected with an input shaft of a transmission. As the friction lining of the friction disc wears, adjustment is required. To provide for adjustment, clutches may include a multiple cam ring adjuster between the apply spring or lever and the pressure plate. Adjustment mechanisms may include a first cam ring that is fixed that engages a second rotational ring. A spring may be provided to urge the second cam ring to rotate with respect to the first cam ring. As the second cam ring rotates, the distance between the apply spring or lever and an extreme end of the pressure plate increases to compensate for the friction plate wear. Springs including torsional springs may be attached to the various components. However, such prior art torsion springs may be prone to problems such as overlapping of the spring coils or unintended release of the torsion spring from the various components. There is therefore a need in the art for an improved adjustment mechanism that fixes the spring in a coupled relationship with the various components. There is also a need in the art for an adjustment mechanism that is easy to assemble and provides a cost effective and reliable mechanism.

SUMMARY OF THE INVENTION

In one aspect there is disclosed, a friction clutch for a motor vehicle coupling an engine flywheel to a transmission that includes a cover coupled to an engine flywheel. A pressure plate is coupled to the cover and the pressure plate includes a flat annular surface and an opposing surface having an annular groove formed therein. A friction disc is positioned between the flywheel and pressure plate. A diaphragm spring is positioned between the cover and the pressure plate biasing the pressure plate toward the friction disc. An adjustment mechanism is positioned between the diaphragm spring and the pressure plate, the adjustment mechanism including: a first cam ring rotatably fixed with respect to the pressure plate,
a second cam ring rotatable relative to the first cam ring and both cam rings having a plurality of cam surfaces configured such that rotation of the second cam ring relative to the first cam ring varies a height of the adjustment mechanism, and a torsion spring including a longitudinal axis. The torsion spring is disposed in the annular groove. The torsion spring extends to a first end connected to the first cam ring and the torsion spring has a second end connected to the pressure plate. The torsion spring applies a biasing force to the second cam ring promoting rotation of the second cam ring relative to the first cam ring. The pressure plate includes a locking slot formed therein partially through the pressure plate and through the opposing surface. The locking slot is formed at an angle relative to the opposing surface and the second end of the torsion spring includes a locking hook formed thereon. The locking hook extends perpendicular to the longitudinal axis of the torsion spring. The locking hook is disposed in the locking slot fixing the locking hook relative to the pressure plate.

In another aspect, there is disclosed an adjustment mechanism is positioned between the diaphragm spring and the pressure plate, the adjustment mechanism including: a first cam ring rotatably fixed with respect to the pressure plate, a second cam ring rotatable relative to the first cam ring and both cam rings having a plurality of cam surfaces configured such that rotation of the second cam ring relative to the first cam ring varies a height of the adjustment mechanism, and a torsion spring including a longitudinal axis. The torsion spring is disposed in the annular groove. The torsion spring extends to a first end connected to the first cam ring and the torsion spring has a second end connected to the pressure plate. The torsion spring applies a biasing force to the second cam ring promoting rotation of the second cam ring relative to the first cam ring. The pressure plate includes a locking slot formed therein partially through the pressure plate and through the opposing surface. The locking slot is formed at an angle relative to the opposing surface and the second end of the torsion spring includes a locking hook formed thereon. The locking hook extends perpendicular to the longitudinal axis of the torsion spring. The locking hook is disposed in the locking slot fixing the locking hook relative to the pressure plate.

The locking slot includes a planar portion that extends from the end of the locking slot to the opposing surface and the locking slot includes an opposing curved portion including a radius that is less than the radius of the locking hook.

DETAILED DESCRIPTION OF THE PREFERRED EMBODIMENTS

Figure 1:
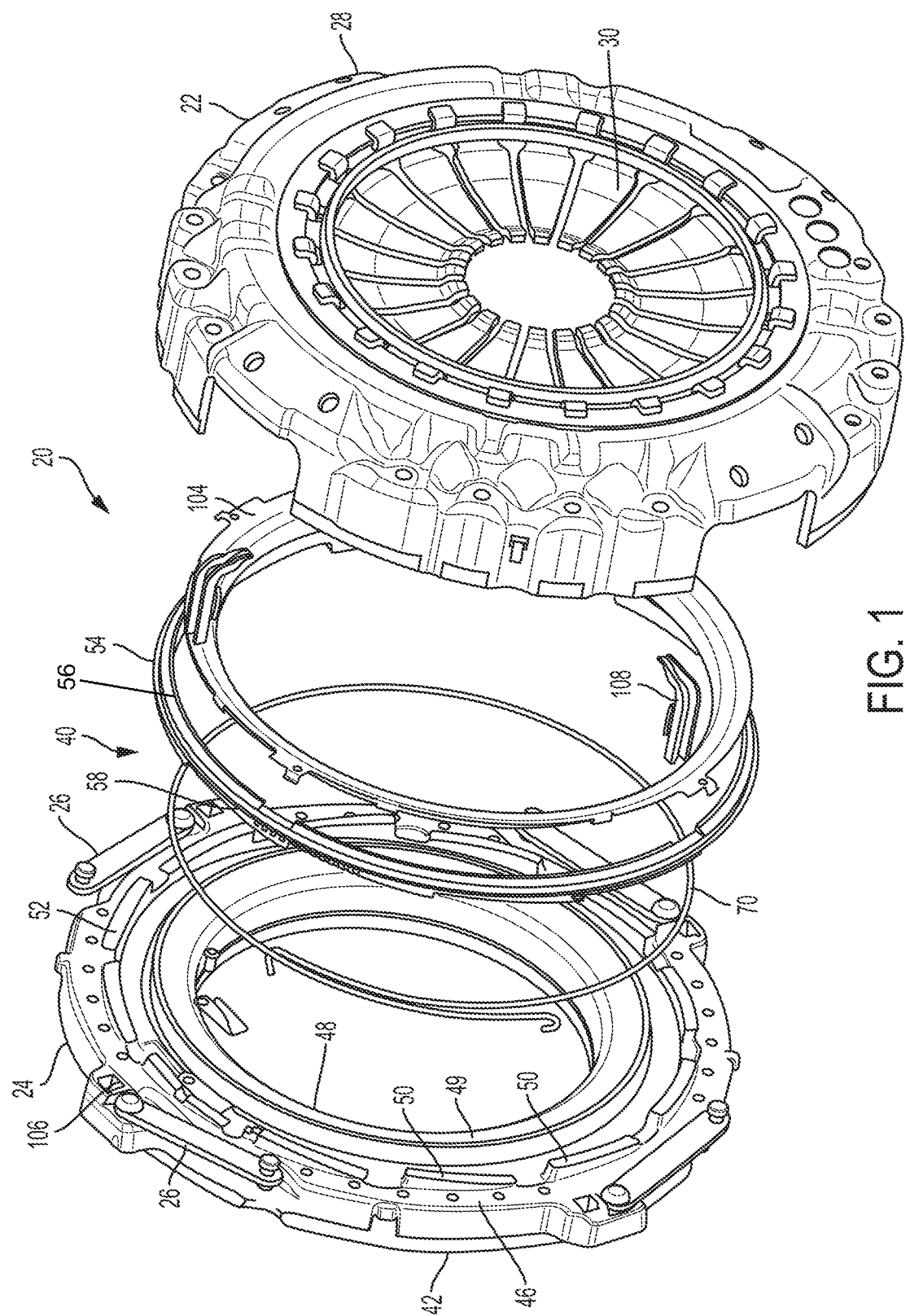
FIG. 1 is a an exploded perspective view of a friction clutch assembly.
Figure 2:
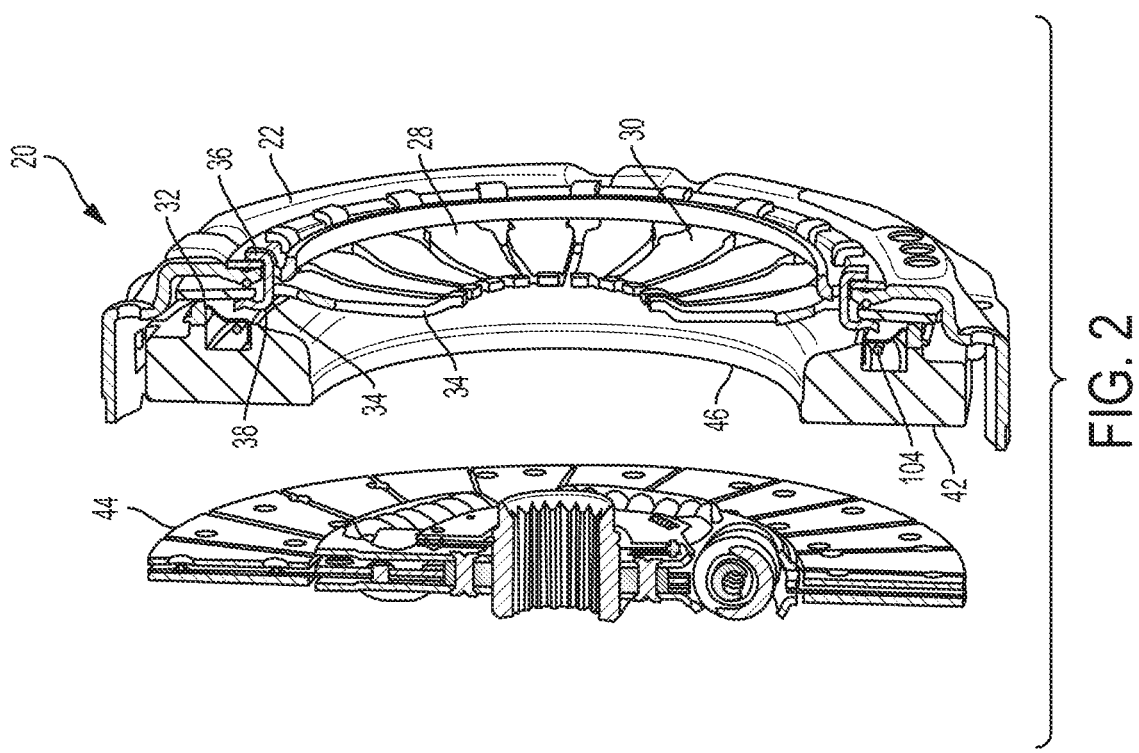
FIG. 2 is a partial cut away section of a friction clutch assembly.

Referring to FIGS. 1-2, there is shown a dry friction clutch assembly 20. The dry friction clutch assembly 20 includes a cover assembly 22 that is torsionally coupled to a flywheel of an engine (not shown). The cover assembly 22 is torsionally coupled to a pressure plate 24 by spring straps 26.

The cover assembly 22 includes a housing 28 and a diaphragm spring 30 positioned therein. The diaphragm spring 30 is a disc-shaped Belleville spring having a continuous solid outer rim portion 32. Projecting radially inward from the rim 32 is a series of diaphragm spring fingers 33. Holding the diaphragm spring 30 in position is a lower fulcrum ring 34. The lower fulcrum ring 34 includes an arm 36 that passes through slots in the housing 28 and a ring 38 that is attached to the arms 36. The ring 38 applies an upward force to load the diaphragm spring 30 and maintain it in position. The rim 32 of the diaphragm spring 30 pushes downward on the pressure plate 24 through an adjustment assembly 40 as will be described in more detail below.

The pressure plate 24 has a flat annular surface 42 for engagement with a friction disc 44. The pressure plate 24 also includes an opposing surface 46, having an annular groove 48. The annular groove 48 has a radial inner wall 49. An outer perimeter of the annular groove 48 includes a plurality of ramps 50 which defines an integral first cam ring 52.

The pressure plate 24 is axially movable with respect to the housing 28. The clamping movement of the pressure plate 24 is induced by the clamping load of the diaphragm spring 30 causing the pressure plate 24 to engage with the friction disc 44. The friction disc 44 is engaged with the flywheel to torsionally connect the engine with the input shaft of the transmission. In the normal state of operation, the clutch assembly 20 engages the transmission with the engine unless the clutch is released.

To torsionally disconnect the transmission from the engine, a shift fork (not shown) contacts the fingers 34 causing the diaphragm spring 30 to elastically deform causing the rim 32 to pivot away from the pressure plate 24 allowing the pressure plate 24 to disengage from the friction disc 44.

The adjustment assembly 40 is positioned between the pressure plate 24 and the diaphragm spring 30. The adjustment assembly 40 allows the clutch 20 to compensate for wear of the friction disc 44. The adjustment assembly 40 includes the first cam ring 52. Engaged with the first cam 52 is a second cam ring 54. The second cam ring 54 includes an upper extension to transfer the clamping load from the diaphragm spring 30 to the pressure plate 24. A bottom portion of the second cam ring 54 includes a plurality of ramps 58 for engagement with the first cam ring 52. Rotation of the second cam ring 54 with respect to the first cam ring 52 increases the distance between the diaphragm spring 30 and the pressure plate 24 compensating for wear that reduces the thickness of the friction disc 44.

Figure 3:
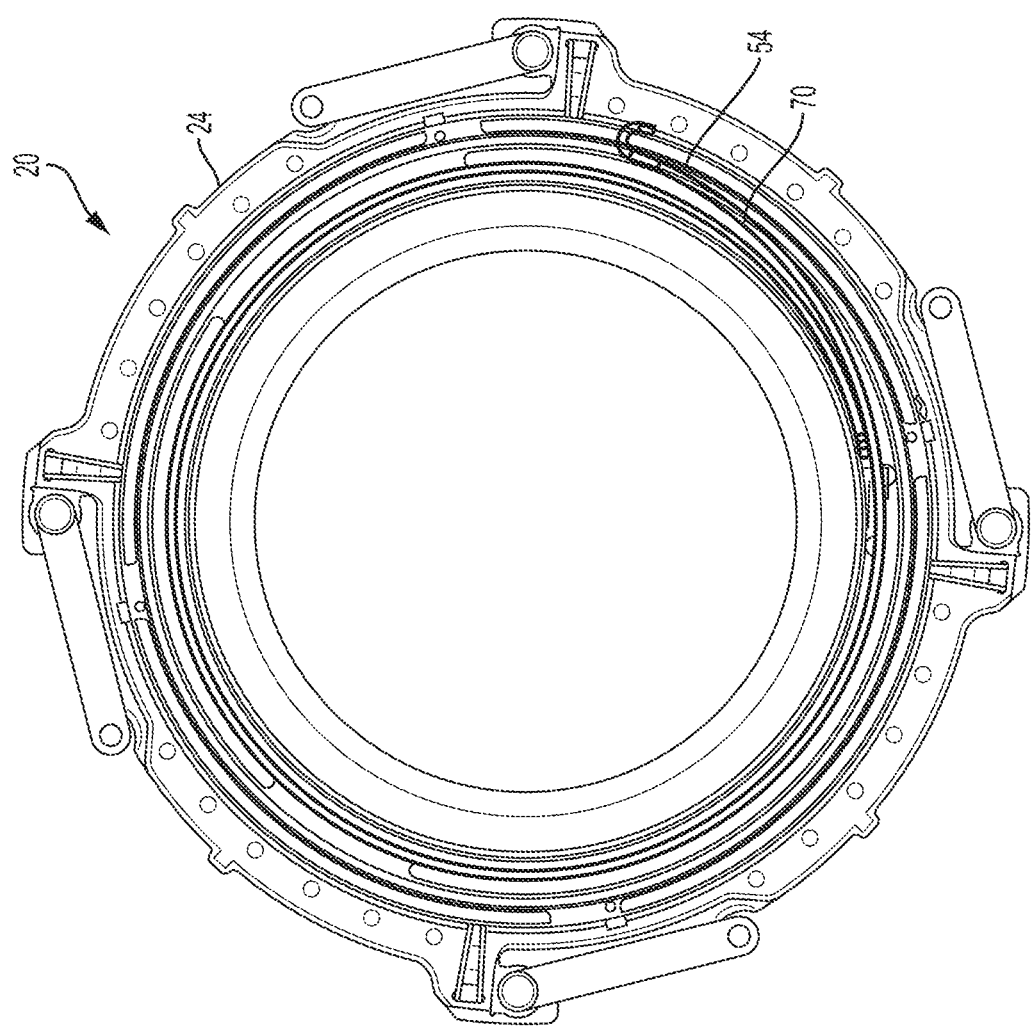
FIG. 3 is a partial top view of a friction clutch assembly showing a torsion spring engagement.
Figure 4:
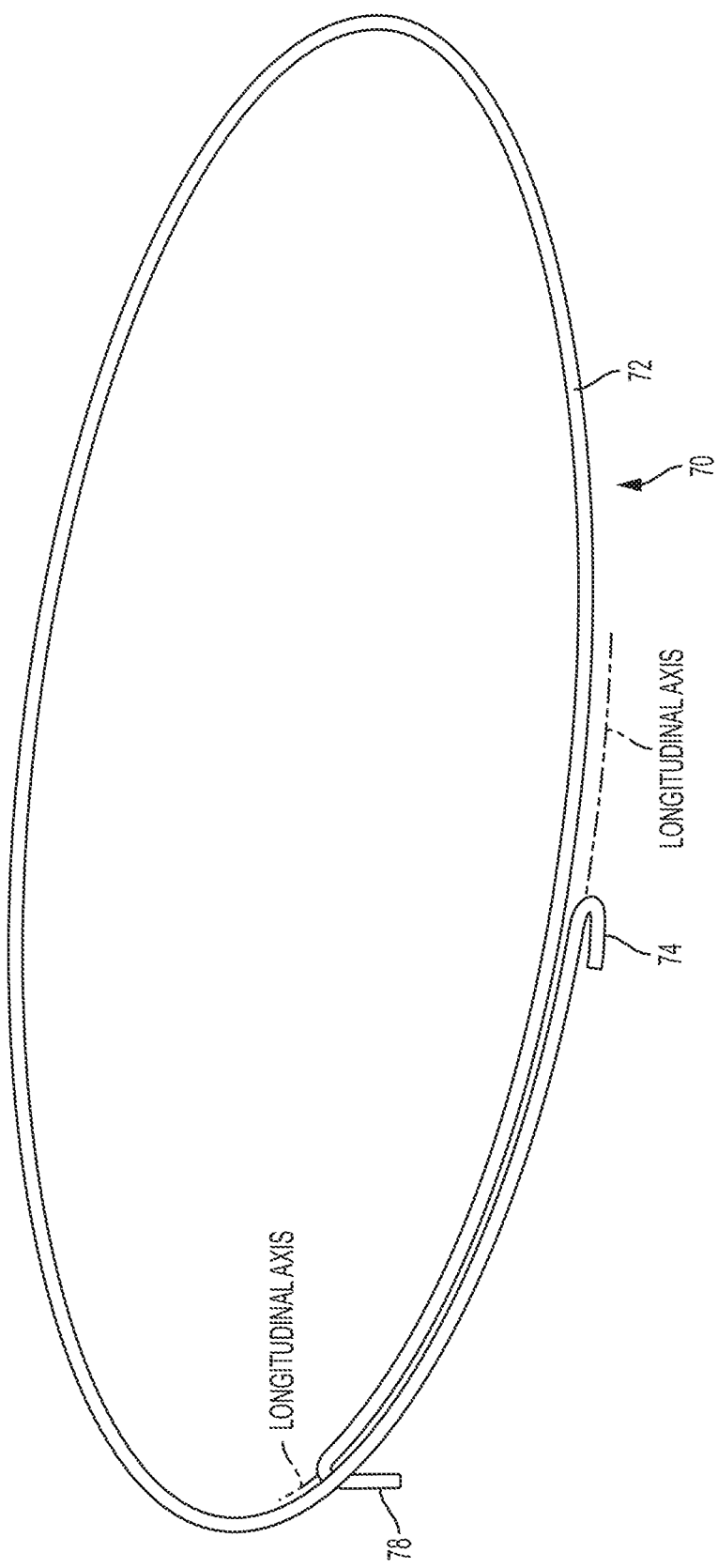
FIG. 4 is a perspective view of a torsion spring.

Referring to FIGS. 3 and 4, the adjustment assembly 40 also includes a torsion spring 70. The torsion spring 70 biases the second cam ring 54 to rotate relative to the first cam ring 52.

Figure 6:
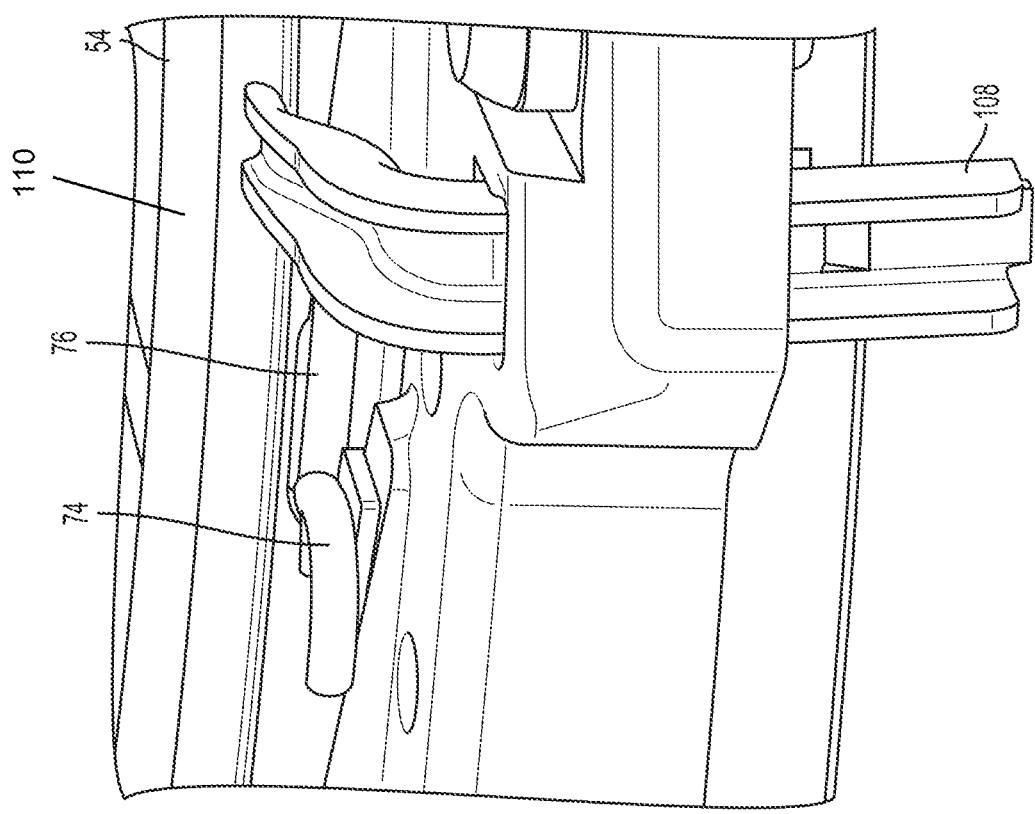
FIG. 6 is a partial perspective view of a first end of the torsion spring engaging a second cam ring.

Referring to FIG. 4, the torsion spring 70 includes a helical round cylindrical body 72 that extends to a first end 74 that is connected with a slot 76 formed in the second cam ring 54, as best seen in FIG. 6. A second end 78 of the torsion spring 70 connects with the pressure plate 24. The torsion spring 70 is formed to straighten out within the annular groove 48 of the pressure plate 24 applying a biasing force to the second cam ring 54 to rotate relative to the first cam ring 52. In one aspect, the torsion spring may be formed of steel such as A401 steel and have a diameter of 4 millimeters.

Figure 5:
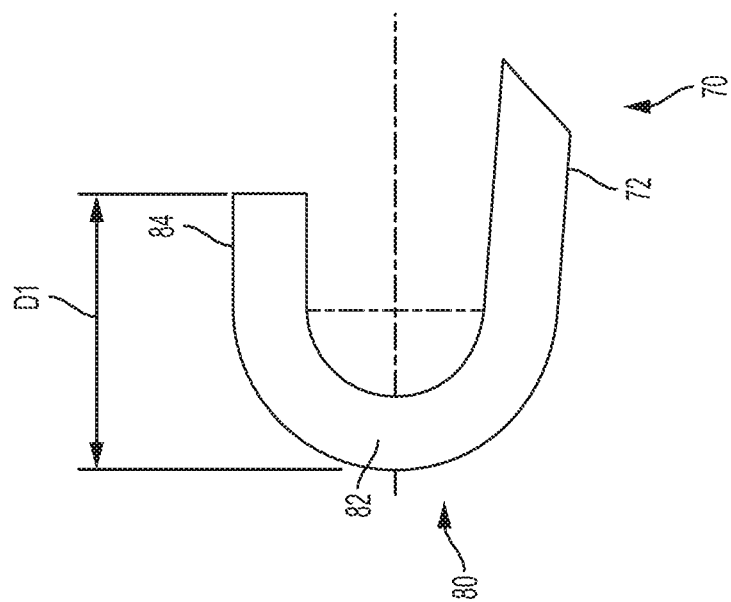
FIG. 5 is a partial sectional view of a first end of the torsion spring.

Referring to FIG. 5, the first end 72 of the torsion spring 70 includes a hook 80 formed thereon that extends coplanar along a longitudinal axis of the cylindrical body 72. In one aspect, the hook 80 may include a radius 82 that extends to a terminal leg 84 to define the shape of the hook 80. The radius 82 may be sized at approximately 4.75 mm measured from an internal center of the radius 82. The terminal leg 84 may extend from the radius 82 a specified distance to provide a sufficient attachment to the slot formed in the second cam. In one aspect, the terminal leg may extend a distance D1 of 15 mm as shown in the figure.

Figure 7:
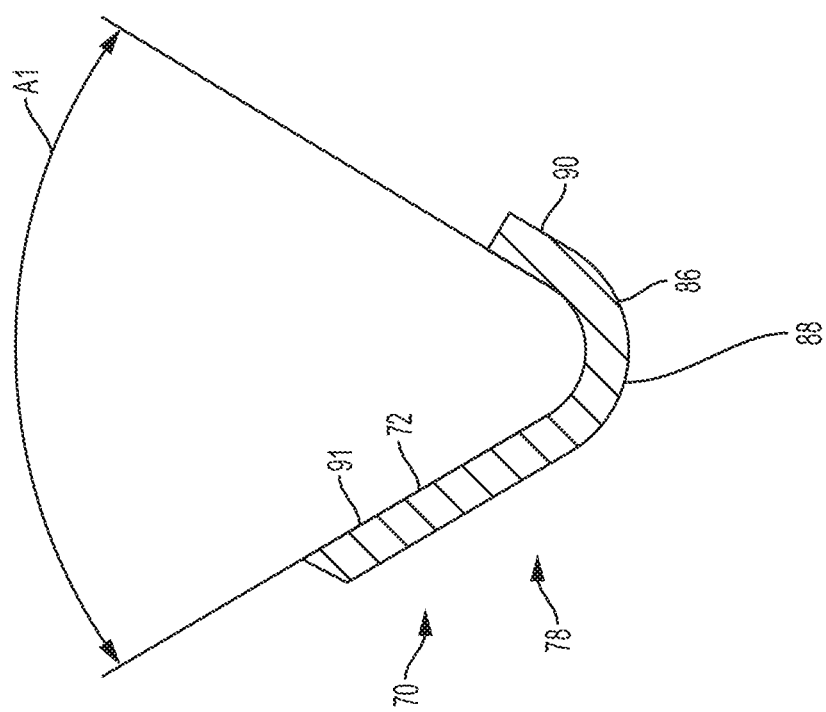
FIG. 7 is a partial sectional view of a second end of the torsion spring.

Referring to FIG. 7, the second end 78 of the torsion spring 70 includes a locking hook 86 formed thereon that extends perpendicular to the longitudinal axis of the cylindrical body 72. In one aspect, the locking hook 86 may include a radius 88 that extends to a terminal leg 90 to define the shape of the locking hook 86. The radius may be sized such that an angle A1 is from 55 to 65 degrees measured between the terminal leg 90 and a portion of the cylindrical body 91 at the start of the radius 92 as shown in the figure.

Figure 8:
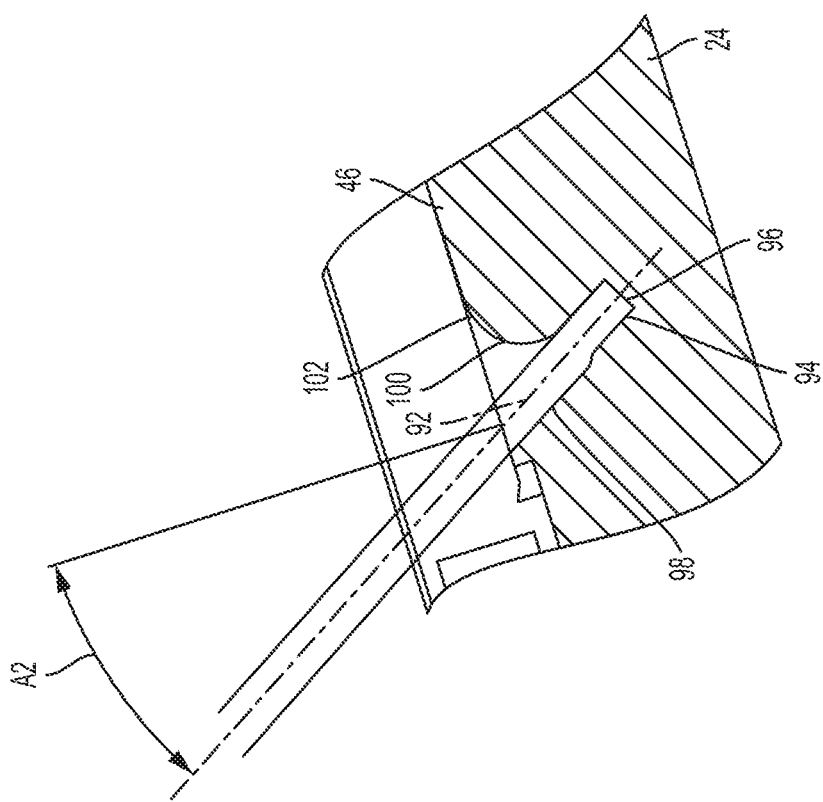
FIG. 8 is a partial sectional view of a locking slot formed in a pressure plate.
Figure 9:
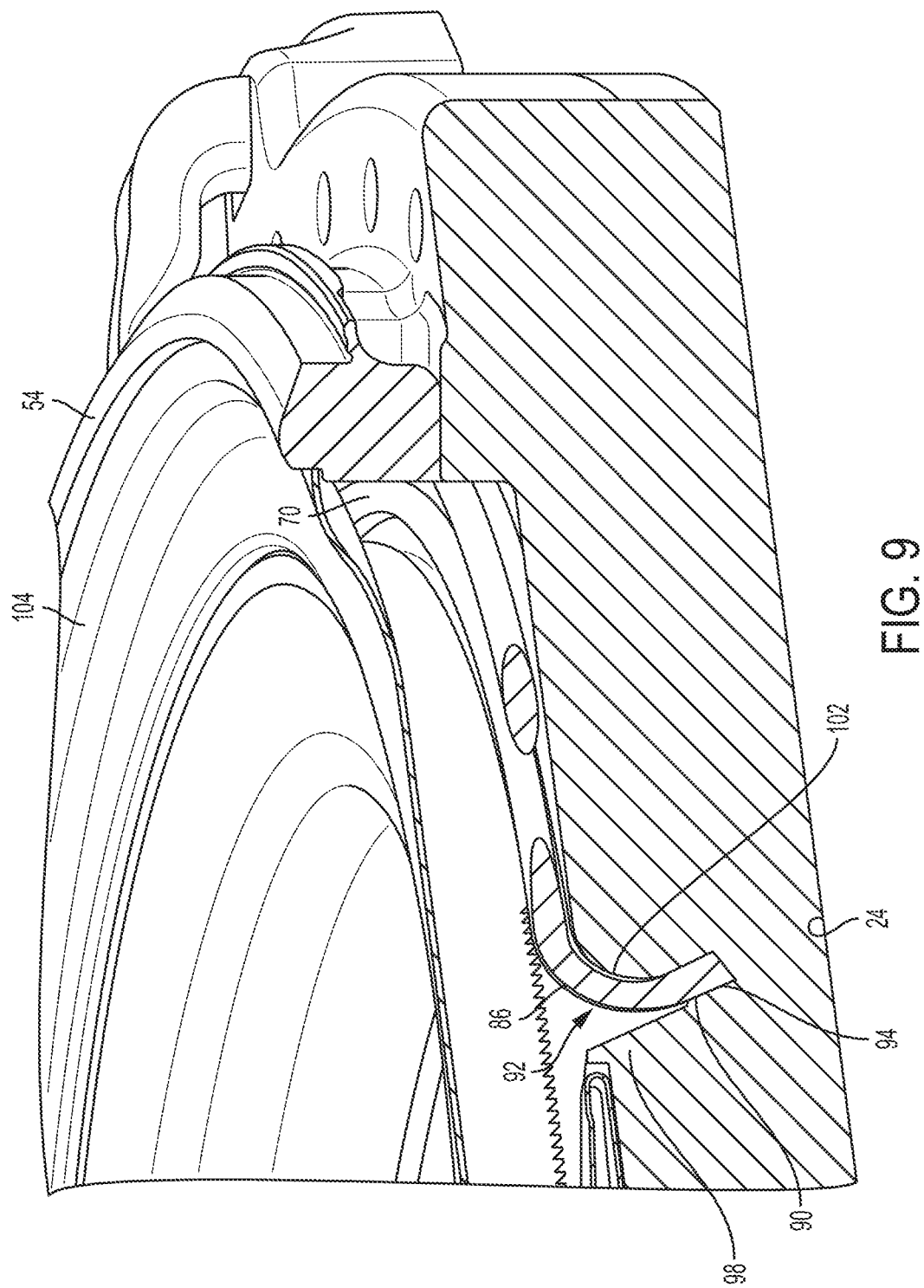
FIG. 9 is a partial perspective cut away section of the clutch assembly showing the torsion spring in an initial installed state with the second end of the torsion spring positioned in the lock slot.
Figure 10:
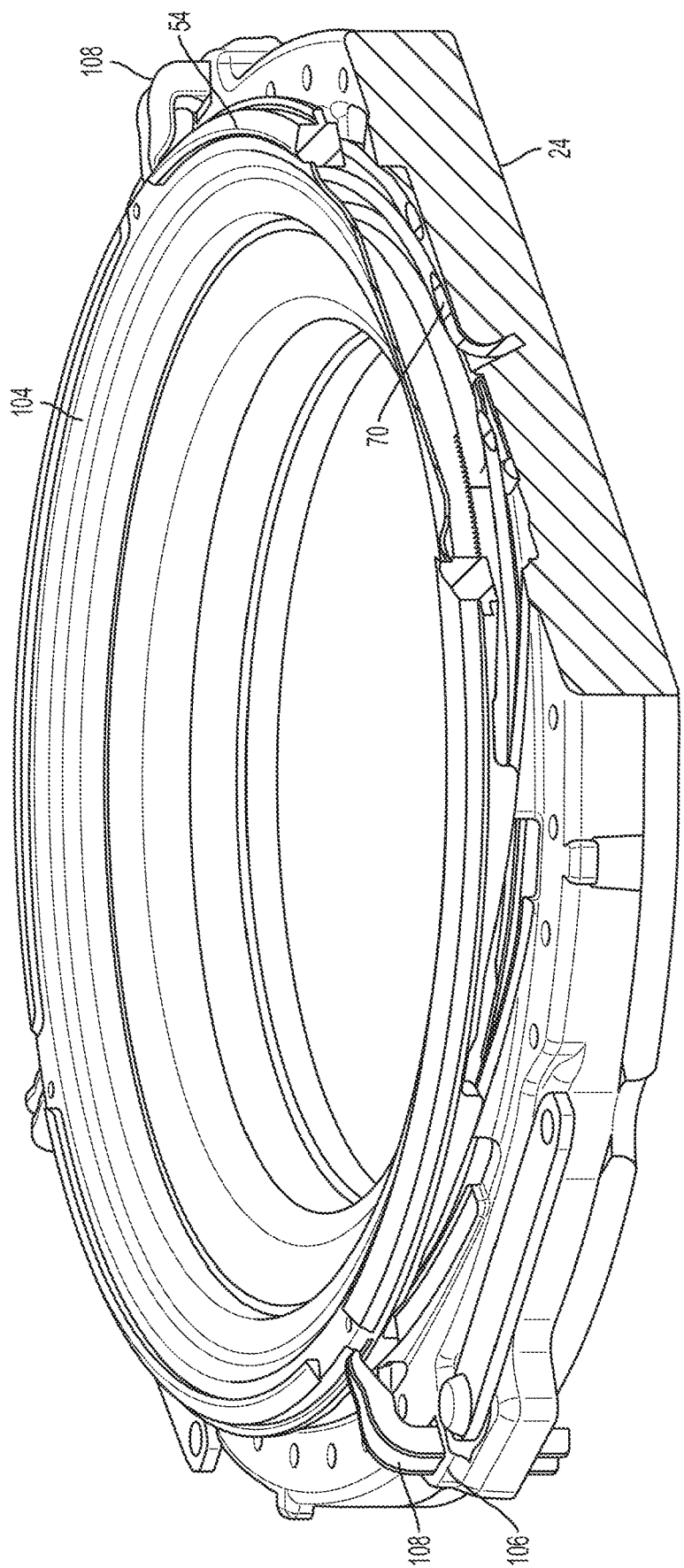
FIG. 10 is a partial perspective cut away section of the clutch assembly showing the torsion spring in a worn state with the second end of the torsion spring positioned in the lock slot.

Referring to FIGS. 8-10, the second end 78 of the torsion spring 70 is positioned within a locking slot 92 formed in the pressure plate 24. The slot is formed partially through the pressure plate 24 and through the opposing surface 46. The locking slot 92 is formed at an angle relative to the opposing surface 46. The slot may be angled from 25 to 35 degrees as measured to an axis that is perpendicular to the opposing surface 46 as shown in FIG. 7 as A2. The locking slot 92 includes a reduced diameter portion 94 at an end 96 of the locking slot 92. The reduced diameter portion 94 is sized to receive the terminal leg 90 and maintain the terminal leg 90 within the locking slot 92. In one aspect the reduced diameter portion 94 may include a diameter that is a half millimeter larger than the diameter of the torsion spring 70. The reduced diameter portion 94 may extend a depth to capture the terminal leg 90 such as approximately 6.50 mm.

The locking slot 92 includes a planar portion 98 that extends from the end 96 of the locking slot 92 to the opposing surface 46. The planar portion 98 allows for easy insertion of the second end 78 of the torsion spring 70 into the locking slot 92 during assembly of the clutch. The locking slot 92 also includes an opposing curved portion 100 that accommodates the radius 88 of the locking hook 86. In one aspect, the curved portion 100 includes a radius 102 that is less than the radius 88 of the locking hook 86. In one aspect, the radius 102 is sized from 0.1 to 0.2 mm smaller than the radius 88 to allow slight flexing of the locking hook 86 while maintaining the terminal leg 90 within the locking slot 92. As the torsion spring 70 straightens it becomes more helical in shape. The angled locking slot in combination with the locking hook 86 maintains the engagement as the spring changes its shape.

Figure 11:
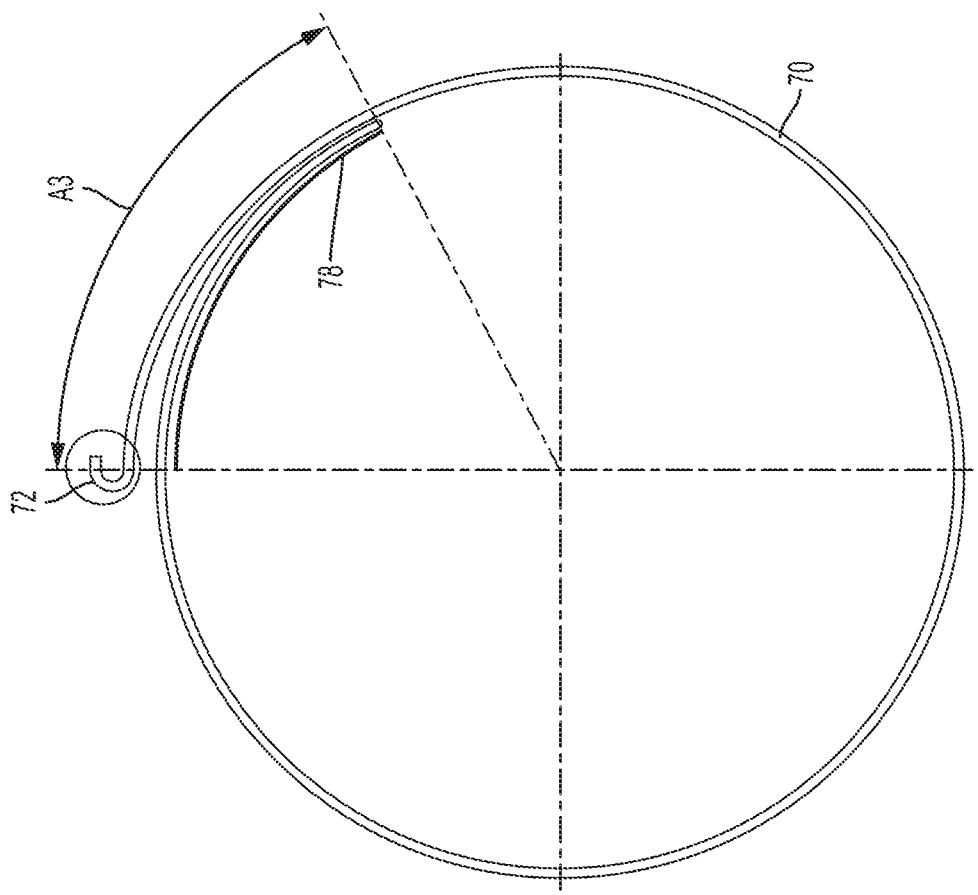
FIG. 11 is a top view of the torsion spring in an initial installed state.
Figure 12:
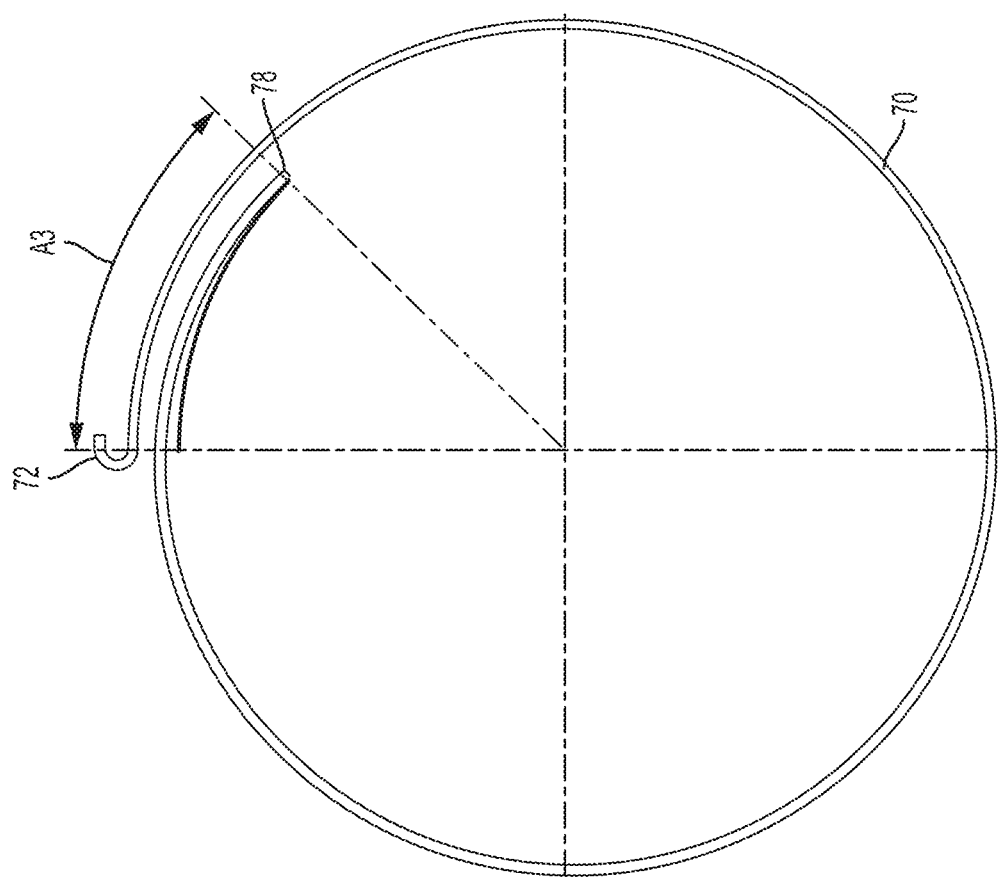
FIG. 12 is a top view of the torsion spring in a worn state.

Referring to FIGS. 10-11, there is shown the torsion spring 70 in the initial installed state and a worn state, respectively. As described above, the torsion spring 70 biases the second cam ring 54 to rotate relative to the first cam ring 52 and expands to accommodate for wear in the friction disc 44. In one aspect, the first end 72 of the torsion spring 70 is radially separated from the second end 78 as shown by the angle A3 shown in FIGS. 10 and 11. The angle A3 in the initial installed state in FIG. 10 may be 62 degrees. The angle A3 in the worn state in FIG. 11 may be 44 degrees. The difference between the values of A3 between the two states defines a radial travel of the torsion spring 70 and the second cam ring 54 relative to the first cam ring 52 of approximately 18 degrees.

Again referring to FIGS. 1-2 and 9-10 a baffle 104 is connected with the second cam ring 54. The baffle 104 environmentally protects torsion spring 70 from dirt and other debris. The baffle 104 engages with the second cam ring 54 for a simple installation.

Positioned within the apertures 106 formed in the pressure plate 24 are control fingers 108. Control fingers 108 contact with the engine flywheel and are also positioned adjacent to a radial rim 110 of the second cam ring 54. The control finger 108 will prevent rotation of the second cam ring 54 with respect to the first cam ring 52 unless adjustment is appropriate.

In use, diaphragm spring 30 applies a force to the second cam ring 54 which in turn forces downwardly upon the first cam ring 52 integral with the pressure plate 24 to cause the pressure plate 24 to clamp downward on the friction disc 44 against the flywheel of the engine coupling the engine with the transmission input shaft of a vehicle. To decouple the transmission from the engine, a push type release fork (not shown) is utilized to push the leaves (fingers) 34 of the diaphragm spring 30 towards the pressure plate 24 decoupling the clutch. A return of the release fork couples the transmission with the engine.

If the friction disc 44 is not sufficiently worn, no adjustment can occur as the control fingers 108 engage with second cam ring 54 preventing adjustment. Upon sufficient wear of the friction disc 44, relative movement of the pressure plate 24 with respect to the control fingers 108 will occur forming an adjustment gap. Upon the next release of the pressure plate 24 from the frictional disc 44, second cam ring 54 will rotate relative to the first cam ring 52 in response to the biasing force of the torsion spring 70 adjusting of the second cam ring 54 to compensate for a reduced thickness of the friction disc 44. The angled locking slot 92 as described above, directs a portion of the force applied by the torsion spring 70 into the locking slot 92 to maintain engagement of the torsion spring 70 with the pressure plate 24 throughout various positions and movement of the second cam ring 54 and against external influences such as vibration from the engine.

The invention has been described in an illustrative manner. It is to be understood that the terminology which has been used is intended to be in the nature of words of description rather than limitation. Many modifications and variations of the invention are possible in light of the above teachings. Therefore, within the scope of the appended claims, the invention may be practiced other than as specifically described.

The invention claimed is:

1. A friction clutch for a motor vehicle coupling an engine flywheel to a transmission comprising:
a cover coupled to an engine flywheel;
a pressure plate including a flat annular surface and an opposing surface having an annular groove formed therein, the pressure plate coupled to the cover for rotation therewith;
a friction disc positioned between the flywheel and pressure plate;
a diaphragm spring positioned between the cover and the pressure plate biasing the pressure plate toward the friction disc;
an adjustment mechanism positioned between the diaphragm spring and the pressure plate, the adjustment mechanism including:
a first cam ring rotatably fixed with respect to the pressure plate, a second cam ring rotatable relative to the first cam ring and both cam rings having a plurality of cam surfaces configured such that rotation of the second cam ring relative to the first cam ring varies a height of the adjustment mechanism, and
a torsion spring including a longitudinal axis, the torsion spring disposed in the annular groove, the torsion spring including a cylindrical body that extends to a first end connected to the second cam ring and the torsion spring having a second end connected to the pressure plate, the torsion spring applying a biasing force to the second cam ring promoting rotation of the second cam ring relative to the first cam ring;
wherein the pressure plate includes a locking slot formed therein partially through the pressure plate and through the opposing surface, the locking slot formed at an angle relative to the opposing surface and the second end of the torsion spring including a locking hook formed thereon, the locking hook extending from the longitudinal axis of the torsion spring, the locking hook disposed in the locking slot fixing the locking hook relative to the pressure plate;
a baffle connected with the second cam ring shielding said torsion spring.

2. The friction clutch of claim 1 wherein the torsion spring body includes a helical round body.

3. The friction clutch of claim 1 wherein the first end of the torsion spring includes a hook formed thereon that extends coplanar along a longitudinal axis of the cylindrical body, the hook disposed in a slot formed in the second cam ring.

4. The friction clutch of claim 1 wherein the locking hook includes a radius that extends to a terminal leg defining a shape of the locking hook, the radius sized such that an angle Al is from 55 to 65 degrees measured between the terminal leg and a portion of the cylindrical body at the start of the radius.

5. The friction clutch of claim 1 wherein the locking slot is angled from 25 to 35 degrees as measured to an axis that is perpendicular to the opposing surface.

6. The friction clutch of claim 1 wherein the locking slot includes a reduced diameter portion at an end of the locking slot.

7. The friction clutch of claim 6 wherein the reduced diameter portion is sized to receive a terminal leg of the locking hook and maintain the terminal leg within the locking slot wherein the reduced diameter portion includes a diameter that is a half millimeter larger than a diameter of the torsion spring.

8. The friction clutch of claim 6 wherein the reduced diameter portion extends a depth to capture a terminal leg wherein the depth is 6.50 mm.

9. The friction clutch of claim 1 wherein the locking slot includes a planar portion that extends from the end of the locking slot to the opposing surface.

10. The friction clutch of claim 1 wherein the locking slot includes an opposing curved portion including a radius that is less than a radius of the locking hook.

11. The friction clutch of claim 1 wherein the first end of the torsion spring is radially separated from the second end and wherein the radially separation changes from an initial installed state to a worn state and wherein a difference between the two states defines a radial travel of the torsion spring and the second cam ring relative to the first cam ring of approximately 18 degrees.

12. The friction clutch of claim 1 including a control finger contacting the flywheel and positioned adjacent to a radial rim of the second cam ring preventing rotation of the second cam ring with respect to the first cam ring unless adjustment is required from wear of the friction disc.

13. An adjustment mechanism for a friction clutch for a motor vehicle coupling an engine flywheel to a transmission comprising:
a first cam ring rotatably fixed with respect to a pressure plate,
a second cam ring rotatable relative to the first cam ring and both cam rings having a plurality of cam surfaces configured such that rotation of the second cam ring relative to the first cam ring varies a height of the adjustment mechanism, and
a torsion spring including a longitudinal axis, the torsion spring disposed in an annular groove, the torsion spring including a cylindrical body that extends to a first end connected to the second cam ring and the torsion spring having a second end connected to the pressure plate, the torsion spring applying a biasing force to the second cam ring promoting rotation of the second cam ring relative to the first cam ring;
wherein the pressure plate includes a locking slot formed therein partially through the pressure plate and through an opposing surface, the locking slot formed at an angle relative to the opposing surface and the second end of the torsion spring including a locking hook formed thereon, the locking hook extending from the longitudinal axis of the torsion spring, the locking hook disposed in the locking slot fixing the locking hook relative to the pressure plate;
wherein the locking slot includes an opposing curved portion including a radius that is less than a radius of the locking hook.

14. The adjustment mechanism of claim 13 wherein the torsion spring body includes a helical round body.

15. The adjustment mechanism of claim 13 wherein the first end of the torsion spring includes a hook formed thereon that extends coplanar along a longitudinal axis of the cylindrical body, the hook disposed in a slot formed in the second cam ring.

16. The adjustment mechanism of claim 13 wherein the locking hook includes the radius that extends to a terminal leg defining a shape of the locking hook, the radius sized such that an angle Al is from 55 to 65 degrees measured between the terminal leg and a portion of the cylindrical body at the start of the radius.

17. The adjustment mechanism of claim 13 wherein the locking slot is angled from 25 to 35 degrees as measured to an axis that is perpendicular to the opposing surface.

18. The adjustment mechanism of claim 13 wherein the locking slot includes a reduced diameter portion at an end of the locking slot wherein the reduced diameter portion is sized to receive a terminal leg of the locking hook and maintain the terminal leg within the locking slot wherein the reduced diameter portion includes a diameter that is a half millimeter larger than a diameter of the torsion spring and wherein the reduced diameter portion extends a depth to capture the terminal leg wherein the depth is 6.50 mm.

19. The adjustment mechanism of claim 13 wherein the locking slot includes a planar portion that extends from the end of the locking slot to the opposing surface.

20. An adjustment mechanism for a friction clutch for a motor vehicle coupling an engine flywheel to a transmission comprising:
a first cam ring rotatably fixed with respect to a pressure plate,
a second cam ring rotatable relative to the first cam ring and both cam rings having a plurality of cam surfaces configured such that rotation of the second cam ring relative to the first cam ring varies a height of the adjustment mechanism, and
a torsion spring including a longitudinal axis, the torsion spring disposed in an annular groove, the torsion spring including a cylindrical body that extends to a first end connected to the second cam ring and the torsion spring having a second end connected to the pressure plate, the torsion spring applying a biasing force to the second cam ring promoting rotation of the second cam ring relative to the first cam ring;
wherein the pressure plate includes a locking slot formed therein partially through the pressure plate and through an opposing surface, the locking slot formed at an angle relative to the opposing surface and the second end of the torsion spring including a locking hook formed thereon, the locking hook extending perpendicular to the longitudinal axis of the torsion spring, the locking hook disposed in the locking slot fixing the locking hook relative to the pressure plate and wherein the locking slot includes a planar portion that extends from the end of the locking slot to the opposing surface and the locking slot includes an opposing curved portion including a radius that is less than a radius of the locking hook.

21. The adjustment mechanism of claim 20 wherein the torsion spring body includes a helical round body.

* * * * *